United States Patent
van Greunen et al.

(10) Patent No.: US 7,894,481 B2
(45) Date of Patent: Feb. 22, 2011

(54) METHODS AND SYSTEMS FOR DYNAMIC FRAGMENTATION OF PACKETS BY COMMUNICATION NETWORK NODES

(75) Inventors: Jana van Greunen, Redwood City, CA (US); William E. San Filippo, III, Los Altos Hills, CA (US); Sterling Hughes, San Mateo, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 130 days.

(21) Appl. No.: 12/347,809

(22) Filed: Dec. 31, 2008

(65) Prior Publication Data

US 2010/0166015 A1     Jul. 1, 2010

(51) Int. Cl.
*H04J 3/24* (2006.01)
*H04J 3/14* (2006.01)

(52) U.S. Cl. ...................... 370/474; 370/252
(58) Field of Classification Search ............ 370/473, 370/474, 252, 412
See application file for complete search history.

(56) References Cited

U.S. PATENT DOCUMENTS

| | | | |
|---|---|---|---|
| 6,477,627 B1 * | 11/2002 | Ofek | 711/162 |
| 6,487,393 B1 * | 11/2002 | Davenport et al. | 455/67.7 |
| 6,876,669 B2 * | 4/2005 | Shalom | 370/468 |
| 6,891,832 B1 | 5/2005 | Chien et al. | |
| 6,956,867 B1 * | 10/2005 | Suga | 370/465 |
| 7,337,231 B1 | 2/2008 | Li | |
| 7,355,971 B2 * | 4/2008 | Jason, Jr. | 370/231 |
| 7,477,627 B2 * | 1/2009 | Ginzburg et al. | 370/333 |
| 7,719,967 B2 * | 5/2010 | Thakur | 370/229 |
| 2003/0117972 A1 * | 6/2003 | Vimpari | 370/328 |
| 2007/0195820 A1 * | 8/2007 | So et al. | 370/470 |
| 2008/0025308 A1 * | 1/2008 | Morgan et al. | 370/392 |
| 2008/0270528 A1 * | 10/2008 | Girardeau et al. | 709/203 |

FOREIGN PATENT DOCUMENTS

WO     2006012211 A2     2/2006

OTHER PUBLICATIONS

Network Advertisement and Selection Proposal for IEEE 802.1af, Aug. 2007, 7 pages.

(Continued)

*Primary Examiner*—Kwang B Yao
*Assistant Examiner*—Candal Elpenord
(74) *Attorney, Agent, or Firm*—Buchanan Ingersoll & Rooney PC

(57) ABSTRACT

Methods and devices are disclosed for dynamically fragmenting packets transmitted in a communications network. Fragments are generated by splitting a packet based on a value of a fragment size parameter. A first fragment is sent to a receiving node. As the sending node, a transmission success parameter is determined that indicates whether the first fragment was successfully received. Based on the value of the transmission success parameter, a link quality parameter value representing a chance a second fragment having the same size as the first fragment will be successfully received by the receiving node is updated. The sending node compares the value of the link quality parameter and a value of a quality threshold parameter and changes the value of the fragment size parameter based on a result of the comparison.

37 Claims, 3 Drawing Sheets

OTHER PUBLICATIONS

Cisco-Intermediate System-to-Intermediate System (IS-IS) TLVs, Document ID 5739, Aug. 1, 2005, 8 pages.

Cisco Systems White Paper, "LLDP-MED and Cisco Discovery Protocol," Document ID C11-351374-00, Jun. 2006, 13 pages.

Srinivasan, M., "Tutorial on the Link Layer Discovery Protocol," Net-O2 Technologies, Feb. 1, 2005, 8 pages.

International Search Report and Written Opinion issued in PCT/US2009/006617 dated Mar. 5, 2010.

\* cited by examiner

METHODS AND SYSTEMS FOR DYNAMIC FRAGMENTATION OF PACKETS BY COMMUNICATION NETWORK NODES

TECHNICAL FIELD

The present disclosure relates to the dynamic configuration of communications between devices in a network.

BACKGROUND

Network devices employ protocol stacks that organize communication software in hierarchical layers. For instance, TCP/IP (Transmission Control Protocol/Internet Protocol) follows the Open System Interconnection (OSI) Model that has seven-layers, including four upper layers, which are directed to software applications, and three lower layers, which are directed to handling data packets.

Some network protocols transmit packets by dividing them into smaller units in a process called "fragmentation." When a fragmented packet is transmitted, the packet is reassembled from its constituent fragments at the destination. Generally, the lower layers of the network protocol are responsible for reassembling packets and handing them up to higher layers.

In some networks, fragmentation can improved communication links by reducing bit errors that may occur in transmission of large packets. In other networks, fragmentation can overcome the problem of transmitting packets through networks having different packet size limitations. For instance, the Internet Protocol (IP) fragments packets when they larger than the maximum transmission size of the network over which it must be sent.

Fragmentation can have negative consequences as well. For example, it may result in an excessive number of retransmissions because some network protocols retransmit all of the fragments in order to recover from the loss of a single fragment. Furthermore, there is an overhead cost associated with the transmission each additional fragment.

SUMMARY

Because the reliability of communication links between network nodes within a network may vary, using a predetermined fragment size for all transmissions can be inefficient. Embodiments disclosed herein optimize network performance by dynamically changing the size of fragments sent over a communication link between two nodes according to the quality of the link.

In some embodiments, a sending node generates fragments by splitting a packet based on a value of a fragment size parameter. A first fragment is sent over a communication link to a receiving node. At the sending node, a transmission success parameter is determined that indicates whether the first fragment was successfully received. Based on the value of the determined transmission success parameter, a value for a link quality parameter is updated. The sending node compares the value of the link quality parameter with a value of a quality threshold parameter, and changes the value of the fragment size parameter based on a result of the comparison.

Any network layer that has access to link quality information between sending and receiving nodes, and can initiate a packet according to a communication protocol, may generate fragments consistent with embodiments disclosed herein. For example, in an exemplary embodiment, a node may generate fragments that conform to a Media Access Control (MAC) sublayer protocol for network communications, in which packets have type-length-value (TLV) elements.

It is to be understood that both the foregoing summary and the following detailed description are exemplary and explanatory only, and are not restrictive of the invention, as claimed.

DETAILED DESCRIPTION

Figure 1:
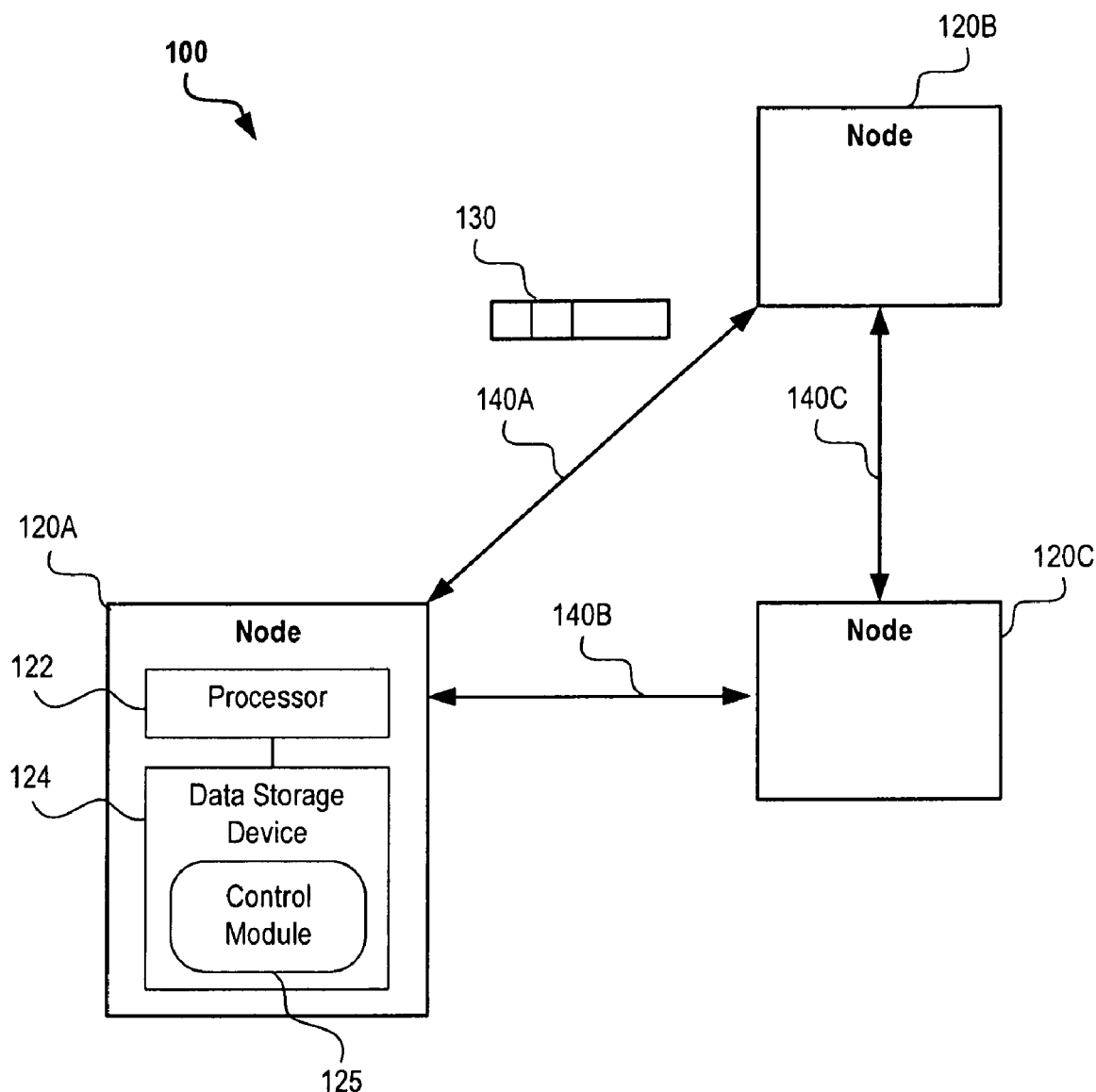
FIG. 1 is a block diagram illustrating a network consistent with exemplary embodiments disclosed herein.

FIG. 1 is a block diagram illustrating an example of a network 100 having a plurality of nodes 120 connected by communications links 140, which may be wired, fixed wireless, or mobile wireless links. In network 100, information can be transmitted within one or more data packets, such as data packet 130, according to packet-switching protocols, such as Transaction Control Protocol (TCP)/Internet Protocol (IP), X.25, and Frame Relay. As illustrated in FIG. 1, a node 120A can generate a packet, such as data packet 130, and transmit it to a node 120B over communication link 140A.

Various embodiments of network 100 can be connected to another network, contain one or more other subnetworks, and/or be a subnetwork within another network. Several embodiments disclosed herein are applicable to wireless networks; for example, a network using 802.15 or 802.16 standards or WCDMA/CDMA 2000 3G standard.

In some embodiments, network 100 is a wireless smart-grid network that monitors and controls a variety of nodes 120 that are devices for generating, distributing, monitoring and/or managing an electrical power service. These devices can connect customer meters and utility grid origination/distribution points with a group of network management servers (e.g., control centers) via combination of wireless networks, Access Points (e.g., gateways) and/or wide area networks (WANs).

Nodes 120 can be any intelligent (e.g., programmable) device connected to a network 100 having hardware and software for transmitting and receiving data packets. For example, nodes 120A can be a general-purpose computer, server, a network device (e.g., gateway, switch, repeater, router), or application-specific device (e.g., residential power meter, remote sensor, set-top box, mobile telephone). Nodes 120A can further include an electronic data processing system or processor 122 for executing computer instructions stored in a computer-readable data storage device 124 (e.g., random access memory, read-only memory, flash memory, magnetic memory or optical memory) for various software modules related to controlling nodes 120 and transmitting data packets between them.

Nodes 120 also have respective software modules or programs comprising computer-executable instructions that, when executed by processor 122, manage the nodes' communications in network 100. As shown in FIG. 1, the computer-executable instructions include a control module 125A in a data storage device 124 for processing, storing and retrieving parameters used to control and configure the communication, functionality and capabilities of node 120A. Although control module 125A is described is a single module, it can be implemented as a hardware device, a combination of hardware and software, or as a plurality of software modules to provide the above-described functionality.

Network 100 is illustrated in FIG. 1 is a simplified example and is sometimes discussed in terms of a utility network. However, other such networks having a number of nodes may benefit from embodiments disclosed herein. For instance, network 100 may be a cable television network, satellite communications network, sensor network, or an ad-hoc wireless communications network.

Figure 2:
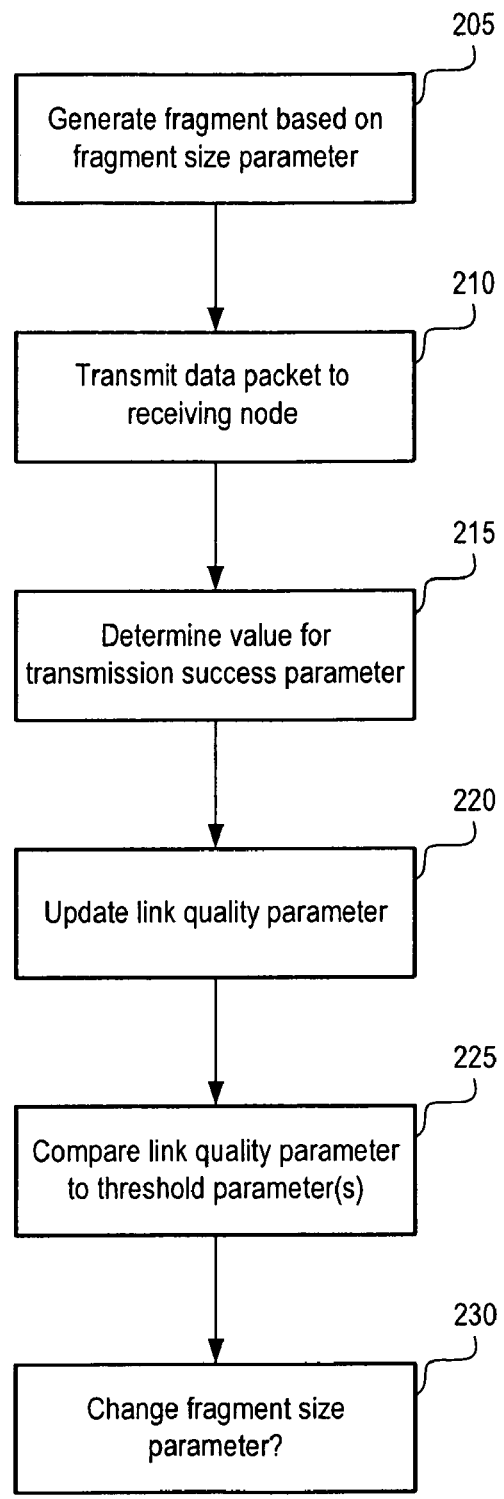
FIG. 2 is a flow chart illustrating a method of dynamically configuring a communications network node consistent with exemplary embodiments disclosed herein.

FIG. 2 is a flow chart illustrating an exemplary method of dynamically fragmenting packets by a node in a communications network. A sending node, such as node 120A, can generate fragments by splitting a packet into portions based on a value of a fragment size parameter. (Step 205) Node 120A may fragment a packet when the data payload exceeds the current value of the fragment size parameter. In some embodiments, node 120 divides the packet into a number of equal size fragments, with any remaining portions being sent in the last fragment. For example, if a packet is 262 bytes in length and the value of the fragment size parameter is 128 bytes, 2 fragments of 87 bytes are sent and one of 88 bytes is sent. Of course, packets can be divided otherwise (e.g., 2 fragments of 128 bytes and 1 fragments of 6 bytes fragment.)

Node 120A sends a first fragment to a receiving node, such as node 120B, over a communication link, such as link 140A. (Step 210) The transmission from node 120A to node 120B can fail for many reasons. For example, the transmission may corrupted due to interference over communication link 140A or due to receiving node 120B's processor being busy.

Node 120A determines a value for a transmission success parameter indicating whether the first fragment was successfully received. (Step 215) Node 120A may determine that the fragment was successfully received using a variety of indications, such as: a response from the dynamic link layer, an acknowledgment received from node 120B, and/or a timeout for a receiving a response. For instance, node 120B may send a reply to a node 120A's transmission indicating that a received fragment failed a cyclic-redundancy check.

Based on the determined value of the transmission success parameter, node 120A updates the value of the link quality parameter, which has a value indicating the link quality for a transmitted fragment over a particular communication link between nodes. (Step 220) The value of the link quality parameter can represent a chance a second fragment having the same size as the first fragment will be successfully received by the receiving node 120B.

The link quality parameter may be based on the number of fragments that are successfully transmitted over communications link 140A between neighboring nodes 120A and 120B. In some embodiments, the value of the link quality parameter can be determined using a weighted moving average, in which the value is based on a predetermined number of transmissions. (E.g., a moving window of the ten most-recent transmissions.) In such case, each transmission by sending node 120A can be associated with a transmission success parameter having a value indicating whether the respective transmission was successfully received by receiving node 120B. For each transmission made after the predetermined number, the success parameter value of the earliest transmission is dropped from the set of transmission success parameter values used to determine the weighted moving average, and the success parameter value of the most recent transmission is added to the set. The number of transmission success parameters included in the weighted moving average can be dynamically changed, for example, by control module 125A to increase or decrease node 125A's sensitivity to changes in the quality of communication link 140A.

Node 120A compares the value of the link quality parameter and a value of a quality threshold parameter. (Step 225) Based on a result of the comparison of the link quality parameter and the quality threshold parameter, the value of the fragment size parameter can be changed to optimize fragment sizes. (Step 230)

When the value of the link quality parameter for communication link 140A is sufficiently high (e.g., has a value greater than some upper threshold and/or that increases at more than some rate over a certain time frame), fragment sizes transmitted over link 140A can be increased. On the other hand, when the link quality parameter is low, (e.g., has a value below some lower threshold and/or that decrease at more than some rate over a certain time frame) the value of fragment size parameter can be lowered. In some cases, control module 125A may use more than one upper threshold and/or more than one lower threshold for the link quality parameter to prevent the fragment size parameter from repeatedly changing (i.e., "bouncing") between values due to volatility of the link quality parameter.

In some embodiments, nodes 120 can use multiple "bins" to track link quality corresponding to different fragment sizes and determine a link quality for each respective bin. For instance, fragment sizes between 0 and 255 bytes may be associated with a first bin; fragment sizes between 256 and 511 bytes may be associated with a second bin, and so on. A bin stores values of the transmission success parameters corresponding to fragment transmissions made for that bin's fragment size. Using the stored values of the transmission success parameters, control module 125A can determine values for a link quality parameter for that fragment size.

Control module 125A can maintain thresholds for the link quality parameters corresponding to each bin. For example, control module 125A can control node 125A to send packets 512 byte fragments when the value of the link quality parameter for the corresponding bin is 90%; whereas 256 byte fragments can be sent when the link quality parameter for the corresponding bin has a value of 95%.

Given the link quality parameter in each bin, node 120A can compare the bin's quality parameter to a set of thresholds for the given fragment size. For instance, if the link quality parameter's value is above or below a threshold, node 120A can select a fragment size corresponding to a different bin.

As noted above, control module 125A may store more than one threshold to prevent constant changes in the selected fragment size parameter that may result from volatility (i.e., instability) in the quality of communication link. For instance, control module 125A can store a first threshold value and a second threshold value, wherein the first threshold is greater than the second. The control module 125A may only select a larger fragment size parameter when the value of the link quality parameter meets or exceeds the first threshold. However, control module 125A can maintain the larger fragment size so long as the value of the link quality parameter exceeds the second lower threshold. In this manner, the spurious changes in the fragment size parameters can be reduced.

In addition, stability can be controlled by changing the number of transmissions used by control module 125 to calculate the value of the link quality parameter for a bin. That is, increasing the number of fragment transmissions from which the value of the link quality parameter is determined can reduce the sensitivity of the link quality parameter to spurious fluctuations in the transmission success parameters.

Further, the value of the fragment size parameter may repeatedly change in instances where a first fragment size results in a low link quality parameter, but fragmenting packets to the next smaller size results in a good success rate that is above the threshold for increasing the packet size. In such case, sending node 120A could repeatedly switch (i.e., bounce) between the larger and smaller fragment sizes, thereby hindering transmission. To avoid this, node 120A can be configured to prevent switching to a larger packet size for a predetermined time when the link quality corresponding to the larger fragment size falls below a third threshold value, which is less than the second threshold value, or when the link quality changes faster than a certain rate over a time frame.

Node 120A's selection of a fragment size can be based on additional factors. For instance, fragmentation can be turned off, such that the fragment size parameter is set to a predetermined value for all communication links with node 120A. Also, node 120A can be configured to only determine a value for the link quality parameter after a minimum number of transmission success parameter values have been collected for a certain fragment size. Also, as noted above, node 120A may be configured to wait a predetermined amount of time before selecting a larger fragment size after a smaller fragment size has been selected by control module 125.

The following description provides a more-detailed example of the above-described bins. Node 120A's control module 125A can maintain a total of four bins each corresponding to a certain fragment size (e.g., a fragment size of 256, 512, 1024 and 2048 bits for bins 0, 1, 2 and 3, respectively.) In addition, a link quality parameter value can be determined for each bin. The bins can also be associated with one or more upper thresholds and/or one or more lower thresholds.

The following exemplary data structure can be used to define bins that store transmit success parameter values and associated values that can be used by control module 12A to control fragmentation of packets:

```
#define NODE_FRAG_NUM_BINS (4)
typedef struct
{
  uint16_t  txpcnt;
  uint16_t  samples;
} NODE_FRAG_BIN;
typedef struct
{
  uint8_t   bin;
  uint8_t   hold_bin;
  uint16_t  frag_size_changes;
  uint32_t  hold_time;
  NODE_FRAG_BIN bins[NODE_FRAG_NUM_BINS];
} NODE_FRAG_INFO;
```

The exemplary data structure provides for a total of four bins. In the data structure above, the term "bin" defines the current fragmentation bin being used for transmission; "hold_bin" is the bin number currently being "held down" such that the fragment size is not allowed to increase outside this bin for the given time frame; "frag_size_changes" is the number of times the fragment size has changed (i.e., a switch to a different bin has occurred); "hold_time" is the time at which a node may use a larger fragment size. Each bin is associated with a fragment size parameter (e.g., Bin 0=256 bytes, Bin 1=512, bytes, Bin 2=1024 bytes and Bin 3=2048 bytes). Alternatively, each bin can be associated with a range of fragment size parameters (e.g., Bin-0, 0<fragment size<256; Bin-1, 256≦fragment size<512; Bin 2, 512≦fragment size<1024; and Bin 3, 1024≦fragment size<2048.)

The value of the fragment size parameter used on communication link 140 is determined from the link quality parameter of the current bin for that link. In some cases, nodes 120 can be initialized with a link quality parameter equal to zero. In other cases, the initial link quality parameter can be based on a signal strength indicator received from node 120B. Or, in other cases, the value of the initial link quality parameter can be initialized based previously stored data?

To switch fragment sizes, certain criteria should be met. When a fragment transmission is made to node 120B, from node 120A, control module 125A selected the appropriate bin for the given fragment size. Once the bin is selected, the value of the link quality parameter for that bin is determined and the number of transmissions for the bin is incremented. In some cases, if the number of transmissions sampled used to determine the value of the link quality parameter is less than a predetermined minimum value, nothing is done; otherwise control module 125A can determinate whether to increase or decrease the value of the fragment size parameter.

When making a determination to switch fragment sizes, node 120A compares the current bin being used to the bin which was just updated. For example, the current bin may be bin 3, meaning fragments of up to 2047 bytes are allowed, but the fragment size may have been 100 bytes, meaning that bin 0 was just updated. This case will occur when the packet being transmitted is less than the current bin size.

If the bin being updated is less than the current bin, node 120A compares the value of the link quality parameter to the low threshold (for the bin being updated). If the link quality parameter is lower than the low threshold, node 120A changes the value for the fragment size parameter to a lower value. For instance, the fragment size can be changed to the next lower value and the bin corresponding to this fragment size becomes the current bin. (E.g., if the updated bin was 1 and the current bin is 3, the new current bin will be set to 0 since the fragment success rate for Bin 1 is lower than the low threshold for that bin). In addition, the number of transmissions sampled in the new current bin can be reset to 0.

When a bin having a lower fragment size parameter value is selected, the selected bin may be maintained for a period of time to reduce volatility and/or stability in fragment sizes. Assuming the updated bin was not 0, the hold_bin element can be set to the bin that was just updated and the hold_time element in the node is set to when fragment sizes will be allowed to switch fragment sizes to that bin. The hold_time element is set to the current system time (as measured in seconds from the time when the node was reset) plus the value of hold time. If the updated bin was 0, no hold bin or hold time is set. This means the node will always allow a switch out of bin 0 to a higher bin unless that higher bin is still being held down (once the appropriate number of samples has been accumulated in bin 0).

If the bin being updated is equal to the current bin, node 120 will determine whether the value of the fragment size parameter should be increased or decreased. If the value of the link quality parameter for the bin is lower than a lower threshold, the fragment size can be switched to the next lower bin. If the link quality parameter exceeds an upper threshold for the current bin, the node can increase the fragment size to the next higher bin, assuming that next higher bin is not held down. The bin can be considered not held down if the current system time is greater than the hold time or the hold bin is the bin having the next larger fragment size.

For example, if the bin 1 being updated is Bin 1 and the hold bin is Bin 3, the hold time is ignored and a switch occurs. If Bin 2 is being updated and the hold bin is Bin 3, the code checks to see if the hold time has expired (i.e. current system time is greater than the hold time). Whenever a switch to a bin having a larger fragment size is made, the number of fragment size changes is incremented and the current bin is set to bin just updated plus 1. If the number of transmissions for the new bin is Bin 0, the value of the link quality parameter can be set to that of the previous bin; otherwise the value of the link quality parameter stays at its previous value. If the bin being updated is greater than the current bin being used nothing is done.

Figure 3:
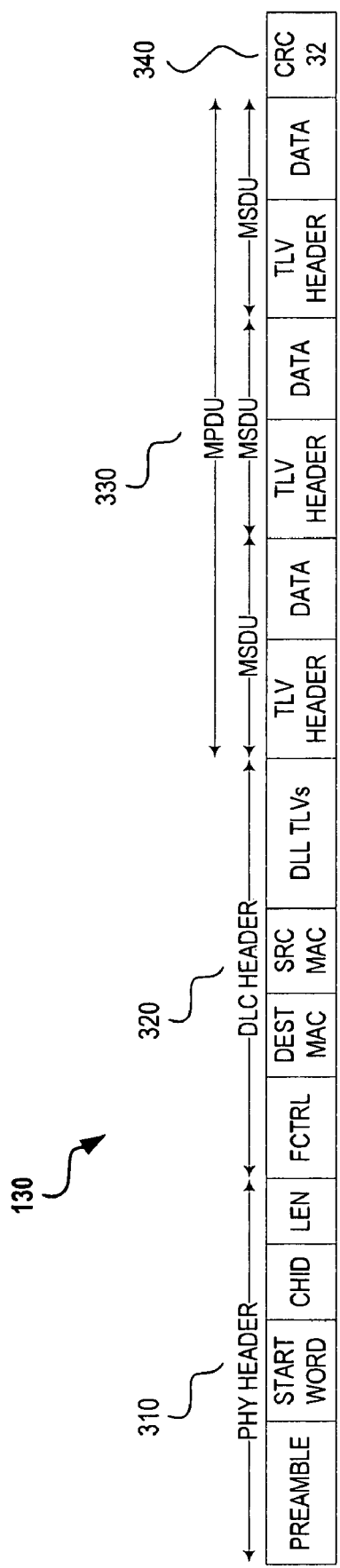
FIG. 3 is a block diagram illustrating an exemplary packet consistent with exemplary embodiments disclosed herein.

FIG. 3 illustrates a diagram of an exemplary data packet 130 consistent with some embodiments in which fragments are generated at the MAC sublayer. Data packet 130 can be comprised of several portions including a physical (PHY) layer header 310, data link control (DLC) header 320, and MAC Protocol Data Unit (MPDU) 330. The DLC header and the MPDU together constitute a MAC-sublayer data packet. This packet is wrapped into a PHY layer packet by adding the PHY header 310 at the beginning. A frame check sequence 340, e.g., a 32-bit cyclic redundancy check, is appended to the end of the packet.

In PHY header 310, the preamble comprises a binary sequence of bits that enables a receiving node, such as node 120B, to detect a signal and achieve frequency and timing synchronization with the remainder of a packet, such as data packet 130, received from a source node, such as node 120A. This synchronization field is followed by a start word, which is comprised of a known binary sequence of bits that, when successfully decoded, trigger receiving node 120B to decode data packet 130 that follows. Among other features, the start word provides symbol-level synchronization, and optimizes autocorrelation properties in conjunction with the preamble sequence of alternating bits that preceded it. A length field (LEN) indicates the length of the remaining portion of packet 130 that the follows the field.

DLC header 320 is the header of the MAC data packet and includes a Frame Control Field (FCTRL). As shown in FIG. 2, DLC header 220 can include a Destination MAC Address (DEST MAC), a Source MAC Address (SRC MAC), and DLL TLVs. Destination MAC Address (DEST MAC) is the unique MAC address of the ultimate target node for the packet, such as node 120B. Source MAC Address (SRC MAC) is the unique MAC address of a sending node, such as node 120A.

DLL TLVs can be used to convey information within communication link 140. Data packet 130 can have a variety of DLL TLVs, for example a protocol may define a communication link information (CLI) TLV, a Sequence Control TLV, and a Data Link Layer (DLL) Cyclic Redundancy Check (CRC) TLV, and possibly a security-related TLV.

The DLL TLV may be used to configure sequence control parameters. One example may be DLL Sequence Control TLV that is designed for DLL fragmentation. The DLL Sequence Control TLV includes several fields including: 'Retry,' 'More Frags,' 'Fragment Number' and 'Sequence Number.' The 'Retry' field is one bit and is set to 1 if this is a retried frame or a fragment from a retried frame (this does not necessarily mean that the particular fragment is a retry). The 'More Frags' field is 1 bit in length and is set to 1 if there are more fragments for this packet (this is not the last fragment). The "Fragment Number" field identifies the fragment of the packet and is used to reassemble (i.e., "defragment") the packet on reception. "Sequence number" can be used for duplicate detection purposes and for reassembly.

Fragmentation can be accomplished using the Sequence Number, Fragment Number and More Frags fields of the SEQCTRL TLV that is sent with MAC data payloads. In some embodiments, fragments are always sent in order and all fragments of a packet contain the same sequence number. The More Frags field is set for all fragments other than the final fragment. When transmission of a fragment fails and is re-transmitted by a node, re-transmission begins with the last unsuccessful fragment such that previously acknowledged fragments do not need to be re-transmitted.

While illustrative embodiments have been described herein, the scope of the invention includes any and all embodiments having equivalent elements, modifications, omissions, combinations (e.g., of aspects across various embodiments), adaptations and/or alterations as would be appreciated by those in the art based on the present disclosure. The recitations in the claims are to be interpreted broadly based on the language employed in the claims and not limited to examples described in the present specification or during the prosecution of the application, which examples are to be construed as nonexclusive.

Although exemplary embodiments have been described with regard to certain networks, the present invention may be equally applicable to other network environments having configurable, intelligent nodes. It is therefore intended that the specification and examples be considered as exemplary only, with a true scope and spirit of the invention being indicated by the following claims.

What is claimed is:

1. A method for dynamically fragmenting packets by a node in a communications network, said method comprising:
    generating a plurality of fragments by splitting a packet based on a value of a fragment size parameter;
    sending a first fragment of said plurality of fragments to a receiving node;
    determining a value of a transmission success parameter for the first fragment, the transmission success parameter indicating whether the first fragment was successfully received;
    updating a value of a link quality parameter based on the value of the transmission success parameter, the value of the link quality parameter representing a chance a second fragment having the same size as the first fragment will be successfully received;
    comparing the value of the link quality parameter and a value of a quality threshold parameter; and
    changing the value of the fragment size parameter based on a result of the comparison,
    wherein
        changing the value of the fragment size parameter includes increasing the value of the fragment size parameter when the value of the link quality parameter surpasses an upper threshold value and decreasing the value of the fragment size parameter when the value of the link quality is less than a lower threshold value;
        the upper threshold value is a first threshold value;
        the lower threshold value is a second threshold value;
        a third threshold value is lower than the second threshold value; and
    the method further comprises preventing an increase of the value of the fragment size parameter for a predetermined period of time after the link quality parameter falls below the third threshold value.

2. The method of claim 1, wherein:
    the first fragment includes a header segment and a data segment; and
    at least some of the data segment includes data encoded as a type-length-value element.

3. The method of claim 1, wherein the sending node is communicatively linked to a plurality of receiving nodes in the network and stores a plurality of fragment size parameters corresponding respectively to the plurality of receiving nodes.

4. The method of claim 1, wherein the sending node stores a plurality of quality threshold parameters corresponding respectively to a plurality of different fragment size parameters.

5. The method of claim 1, wherein the sending node stores a plurality of link quality parameters corresponding respectively to a plurality of different fragment sizes.

6. The method of claim 1, wherein updating a link quality parameter includes:
storing a plurality of transmission success parameter values corresponding to a plurality of fragments; and
changing the link quality parameter after a predetermined number of transmission success parameter values have been stored.

7. The method of claim 1, wherein the value of the link quality parameter represents a percentage of fragments of a certain fragment size that the sending nodes has determined to be successfully received by the receiving node.

8. The method of claim 7, wherein the second threshold value represents one: a minimum value for the link quality parameter or a maximum rate of decrease in the value of the link quality parameter during a time frame.

9. The method of claim 1, wherein the first fragment includes a segment having values corresponding to one or more of: a parameter indicating whether the first fragment is a retry, a parameter indicating whether there are more fragments for the packet, a parameter indicating the number of the fragment of the total number of fragments in the packet, and a parameter identifying the plurality of fragments generated from the packet.

10. The method of claim 9, wherein said segment is formatted as a type-length-value element.

11. The method of claim 1, wherein changing the fragment size includes:
storing a value representing an amount of time for the sendinq node to wait before increasing the value of the fragment size parameter after the value of the fragment size parameter is reduced.

12. The method of claim 1, wherein there are at least four stored values for different link quality parameters corresponding to each receiving node.

13. The method of claim 1, further including determining the value of the link quality parameter using a moving average based on a predetermined number of transmissions.

14. The method of claim 1, further comprising:
establishing the lower threshold value to be a maximum allowable rate of decrease in the value of the link quality parameter during a time frame, and the upper threshold value as a maximum allowable rate of increase in the value of the link quality parameter during the time frame.

15. A non-transitory computer-readable data storage medium storing program instructions that, when executed by a processor in a first node in a communication network having a plurality of nodes, control the first node to perform a method for dynamically fragmenting packets, said method comprising:
generating a plurality of fragments by splitting a packet based on a value of a fragment size parameter;
sending a first fragment of said plurality of fragments to a receiving node;
determining a value of a transmission success parameter for the first fragment, the transmission success parameter indicating whether the first fragment was successfully received;
updating a value of a link quality parameter based on the value of the transmission success parameter, the value of the link quality parameter representing a chance a second fragment having the same size as the first fragment will be successfully received;
comparing the value of the link quality parameter and a value of a quality threshold parameter; and
changing the value of the fragment size parameter based on a result of the comparison,
wherein:
the changing of the value of the fragment size parameter includes:
increasing the value of the fragment size parameter when the value of the link quality parameter surpasses a first, upper threshold value, and
decreasing the value of the fragment size parameter when the value of the link quality is less than a second, lower threshold; and
the method further comprises preventing an increase of the value of the fragment size parameter for a predetermined period of time after the link quality falls below a third threshold value, the third threshold value being lower than the second threshold value.

16. The computer-readable data-storage medium of claim 15, wherein:
the first fragment includes a header segment and a data segment; and
at least some of the data segment includes data encoded as a type-length-value element.

17. The computer-readable data storage medium of claim 15, wherein the first node is communicatively linked to a plurality of receiving nodes in the network and stores a plurality of fragment size parameters corresponding respectively to the plurality of receiving nodes.

18. The computer-readable data storage medium of claim 15, wherein the first node stores a plurality of quality threshold parameters corresponding respectively to a plurality of different fragment size parameters.

19. The computer-readable data storage medium of claim 15, wherein the first node stores a plurality of link quality parameters corresponding respectively to a plurality of different fragment sizes.

20. The computer-readable data storage medium of claim 15, wherein updating a link quality parameter includes:
storing a plurality of transmission success parameters corresponding to a plurality of fragments; and
changing the link quality parameter after a predetermined number of transmission success parameters have been stored.

21. The computer-readable data storage medium of claim 15, wherein the value of the link quality parameter represents a percentage of fragments of a certain fragment size that the sending node has determined to be successfully received by the receiving node.

22. The computer-readable data storage medium of claim 21, wherein the second threshold value represents one: a minimum success percentage or a maximum rate of decrease in a success percentage during a time frame.

23. The computer-readable data storage medium of claim 15, wherein the first fragment includes a segment having values corresponding to one or more of: a parameter indicating whether the first fragment is a retry, a parameter indicating whether there are more fragments for the packet, a parameter indicating the number of the fragments of the total number in the packet, and a parameter identifying the plurality of fragments generated from the packet.

24. The computer-readable data storage medium of claim 23, wherein the segment is formatted as a type-length-value element.

25. The computer-readable data storage medium of claim 15, wherein, the first node stores a value indicating an amount of time for the first node to wait before increasing the fragment size after the fragment size is reduced.

26. The computer-readable data storage medium of claim 15, wherein there are at least four stored values for different link quality parameters corresponding to each receiving node.

27. A node in a network having a plurality of nodes, said node comprising:
   a processor and a non-transitory computer-readable data storage medium coupled to the processor; and
   program instructions stored in the computer-readable medium, the program instructions, when executed by the processor, controlling the node to:
   generate a plurality of fragments by splitting a packet based on a value of a fragment size parameter;
   send a first fragment of said plurality of fragments to a receiving node;
   determine a value of a transmission success parameter for the first fragment, the transmission success parameter indicating whether the first fragment was successfully received;
   update a value of a link quality parameter based on the value of the transmission success parameter, the value of the link quality parameter representing a chance a second fragment having the same size as the first fragment will be successfully received;
   compare the value of the link quality parameter and a value of a quality threshold parameter; and
   change the value of the fragment size parameter based on a result of the comparison;
   increase the value of the fragment size parameter when the value of the link quality parameter surpasses a first, upper threshold value,
   decrease the value of the fragment size parameter when the value of the link quality is less than a second, lower threshold value; and
   preventing an increase of the value of the fragment size parameter for a predetermined period of time after the link quality falls below a third threshold value that is lower than the second threshold value.

28. The node of claim 27, wherein:
   the first fragment includes a header segment and a data segment; and
   at least some of the data segment includes data encoded as a type-length-value element.

29. The node of claim 27, wherein the node stores a plurality of quality threshold parameters corresponding respectively to a plurality of different fragment size parameters.

30. The node of claim 27, wherein the node stores a plurality of link quality parameters corresponding respectively to a plurality of different fragment sizes.

31. The node of claim 27, wherein updating a link quality parameter includes:
   storing a plurality of transmission success parameter values corresponding to a plurality of fragments; and
   changing the link quality parameter after a predetermined number of transmission success parameter values have been stored.

32. The node of claim 27, wherein the value of the link quality parameter represents a percentage of fragments of a certain fragment size that the sending nodes has determined to be successfully received by the receiving node.

33. The node of claim 32, wherein the second threshold value represents one: a minimum value for the link quality parameter or a maximum rate of decrease in the value of the link quality parameter during a time frame.

34. The node of claim 27, wherein the first fragment includes a segment having values corresponding to one or more of: a parameter indicating whether the first fragment is a retry, a parameter indicating whether there are more fragments for the packet, a parameter indicating the number of the fragment of the total number of fragments in the packet, and a parameter identifying the plurality of fragments generated from the packet.

35. The method of claim 34, wherein said segment is formatted as a type-length-value element.

36. The node of claim 27, wherein changing the fragment size includes:
   storing a value representing an amount of time the first node must wait before increasing the value of the fragment size parameter after the value of the fragment size parameter is reduced.

37. The node of claim 27, wherein there are at least four stored values for different link quality parameters corresponding to each receiving node.

* * * * *